UNITED STATES PATENT OFFICE.

AXEL VIGGO BLOM, OF BERNE, SWITZERLAND.

METHOD FOR PRODUCING ASYMMETRIC CARBAMIDS.

1,351,888.  Specification of Letters Patent.  Patented Sept. 7, 1920.

No Drawing.  Application filed April 3, 1919. Serial No. 287,212.

*To all whom it may concern:*

Be it known that I, Dr. AXEL VIGGO BLOM, a citizen of the Swiss Confederation, and residing at Berne, Switzerland, have invented certain new and useful Improvements in Methods for Producing Asymmetric Carbamids, of which the following is a specification.

The present invention has reference to a new and improved process for manufacturing asymmetric carbamids, and relates more particularly to a new method for combining amidonaphtholsulfonic acids and primary diamins of the aromatic series by means of phosgen in the presence of acid binding substances.

It is well known in the art that if phosgen reacts on primary amins in the presence of acid binding substances there result symmetric carbamids. It is further known that if two or more amins are mixed under identical experimental conditions, mixtures of asymmetric carbamids will form which can be separated only with difficulty and which therefore are of little technical value.

The hereinafter described process yields a superior output of asymmetric carbamids, which latter are of great value in the manufacture of dye stuffs and pharmaceutical products.

In carrying out my process two essential conditions are of decisive importance:

(a) The aromatic diamin must contain two primary amido groups reacting with different velocities; the one group must either be protected by a substituent in the ortho-position (toluylendiamin, mono-chlorphenylendiamin, amidoanisidin, and the like), or it must be replaced direct by an easily split off group, such as for instance formylphenylendiamin.

(b) The two components (amidonaphtholsulfonic acid and diamin) must meet the phosgen continuously in molecular amounts at a temperature of about 40° Celsius, while the muriatic acid split off during the reaction is immediately rendered ineffective by a slight excess of an alkali or a carbonate.

The output of asymmetric urea is dependent upon the uniform intermingling of the components with phosgen under continuous agitation. By filtering and fractional salting-out the reaction products are isolated for further treatment. If the reaction is conducted through with care the amount of by-products obtained will be relatively inconsiderable.

The following examples may serve to illustrate the process:—

(1) 285 kilograms of 2-amido-5-naphthol-7-sulfo-acid of 84% strength are dissolved with a slight excess of alkali. Separately 125 kilograms of m-toluylendiamin are dissolved in hot water. In a third vessel a solution of 210 liters of caustic soda lye of 35° Bé with 100 liters of water is prepared. These three solutions are then run simultaneously into a large stirring vat, so that always molecular amounts of the components are present, and finally the required amount of phosgen is added. The above stated conditions and requirements are to be carefully observed. After completion of the reaction the liquor is to be made strongly alkaline and is conducted into a high vat in which the by-products which are filtered off only with difficulty are allowed to settle. The liquid is then drawn off and the asymmetric carbamids are precipitated by means of acid. The output is over 90%. In place of the m-toluylendiamin also p-toluylendiamin can be used.

(2) 140 kilograms of 2-amido-5-naphthol-7-sulfonic acid of 84% strength are treated with an alkali. At the same time 100 kilograms of 70% monoformyl-m-phenylendiamin are dissolved in hot water. A solution of 60 kilograms of soda serves for neutralizing the muriatic acid formed during the reaction. These three solutions are now simultaneously mixed together with phosgen at a temperature of about 40% Celsius. After completion of the condensation the formyl combination can readily be isolated by salting-out. By heating with a soda solution of about 15% strength the formyl group is split off. On acidulating the mixture the asymmetric carbamids separate out in crystalline form.

In place of monoformyl-m-phenylendiamin for reaction purposes also monoformyl-p-phenylendiamin, chloro-m-phenylendiamin, chloro-p-phenylendiamin, diamidodiphenylurea, benzidinsulfonic acid, m-diamidoanisol, p-diamidoanisol, m-diamidophenetol, or p-diamidophenetol can be used.

For neutralizing purposes there may be substituted for the soda other alkali carbonates, carbonates or oxids of alkaline earths, settling alkalis and the like.

What I claim is:

1. The herein described process for the production of asymmetric carbamids, which consists in causing amidonaphtholsulfacid and primary diamins of the aromatic series, containing two primary amido groups reacting with different velocities, to continuously commingle in molecular amounts at a temperature of about 40° Celsius with phosgen, and immediately neutralizing the muriatic acid split off during the reaction.

2. As a new composition asymmetric carbamids containing in the molecule the general group R—NH—CO—NH—R$^1$, R designating the radical of a naphthol-sulfo-acid and R$^1$ the radical of an aromatic amid, which amid contains two primary amido-groups of different reaction velocities.

3. As a new composition asymmetric carbamids as specified in claim 2, in which the aromatic amid is substituted in the ortho-position for one of the amido-groups.

4. As a new composition asymmetric carbamids as set forth in claim 2, in which one of the amido-groups of the aromatic amid is replaced by an acyl-group capable of being easily split off.

Dr. AXEL VIGGO BLOM.